(12) United States Patent
Lohmann et al.

(10) Patent No.: US 11,530,003 B2
(45) Date of Patent: Dec. 20, 2022

(54) INDUSTRIAL TRUCK WITH A DRIVER STANDING PLATFORM

(71) Applicant: Jungheinrich Aktiengesellschaft, Hamburg (DE)

(72) Inventors: Helmut Lohmann, Gyhum (DE); Michael Schueler, Schoenberg (DE); Holger Brunckhorst, Norderstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 404 days.

(21) Appl. No.: 16/751,395

(22) Filed: Jan. 24, 2020

(65) Prior Publication Data
US 2020/0239292 A1 Jul. 30, 2020

(30) Foreign Application Priority Data
Jan. 25, 2019 (DE) ...................... 10 2019 101 869.2

(51) Int. Cl.
*B62D 51/02* (2006.01)
*B62D 51/00* (2006.01)
*B66F 9/075* (2006.01)

(52) U.S. Cl.
CPC ........... *B62D 51/02* (2013.01); *B62D 51/001* (2013.01); *B66F 9/0759* (2013.01)

(58) Field of Classification Search
CPC ............................. B62D 5/102; B66F 9/0759
See application file for complete search history.

(56) References Cited

U.S. PATENT DOCUMENTS

| 4,755,100 A | * | 7/1988 | Schultz | ................... B66F 9/122 60/551 |
| 5,890,562 A |  | 4/1999 | Bartels et al. | |
| 6,182,797 B1 | * | 2/2001 | Tebbe | ................. B66F 9/07531 187/222 |

(Continued)

FOREIGN PATENT DOCUMENTS

| CN | 205801281 U | 12/2016 | |
| CN | 107934842 A | * 4/2018 | ............ B66F 17/003 |

(Continued)

OTHER PUBLICATIONS

EP Application No. 20153522; filed Jan. 24, 2020; European Search Report dated Jun. 15, 2020 (7 pages).

*Primary Examiner* — Kevin Hurley
(74) *Attorney, Agent, or Firm* — Barclay Damon LLP

(57) ABSTRACT

An industrial truck comprises a driver standing platform and at least two side walls forming an entrance to the driver standing platform. One of the at least two side walls comprises a support for a transverse standing position of an operator. The support for the transverse standing position extends along a first plane. A control unit is positioned opposite the entrance and is configured to be operated by the operator while standing on the driver standing platform. A back section is positioned on one of the at least two side walls and configured to extend into the entrance and comprises a support for an oblique front standing position of the operator. The support for the oblique front standing position extends along a second plane and the back section is positioned at an angle relative to the support for the transverse standing position.

13 Claims, 5 Drawing Sheets

(56) References Cited

U.S. PATENT DOCUMENTS

| | | | |
|---|---|---|---|
| 7,497,505 B2 * | 3/2009 | Manci | B66F 9/0759 |
| | | | 296/190.01 |
| 7,870,919 B2 * | 1/2011 | Waltz | B66F 9/07572 |
| | | | 180/89.1 |
| D750,339 S * | 2/2016 | Miggels | D34/35 |
| 10,544,022 B2 * | 1/2020 | Porter | B62D 6/10 |
| 10,577,232 B2 * | 3/2020 | Ewald | B60N 2/38 |
| 2007/0207024 A1 | 9/2007 | Kraimer et al. | |
| 2008/0202857 A1 | 8/2008 | Waltz et al. | |
| 2008/0245620 A1 | 10/2008 | Niemeier | |

FOREIGN PATENT DOCUMENTS

| | | | |
|---|---|---|---|
| CN | 112896340 A * | 6/2021 | ............. B62D 33/06 |
| EP | 1977989 A2 | 10/2008 | |
| EP | 2518008 A1 | 10/2012 | |
| WO | 2006/118925 A2 | 11/2006 | |

* cited by examiner

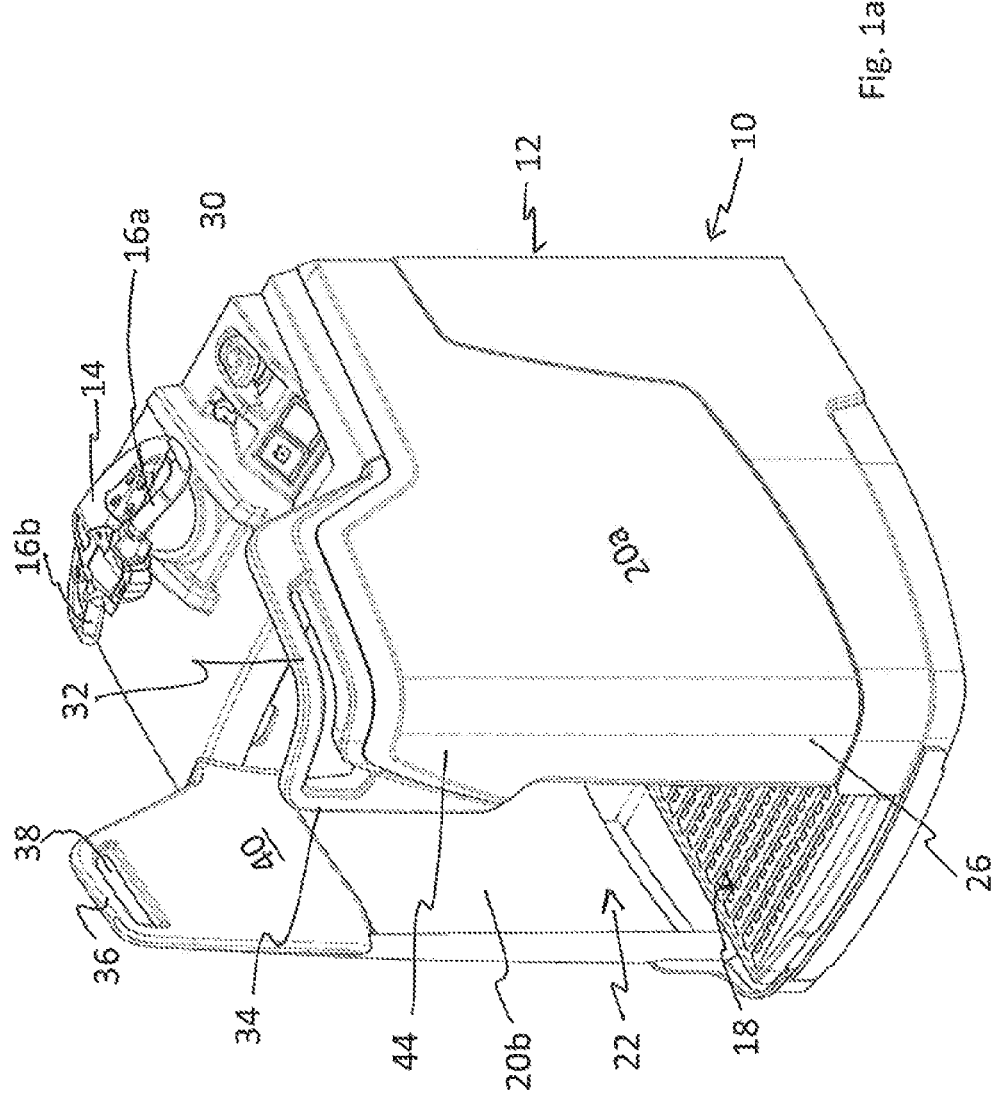

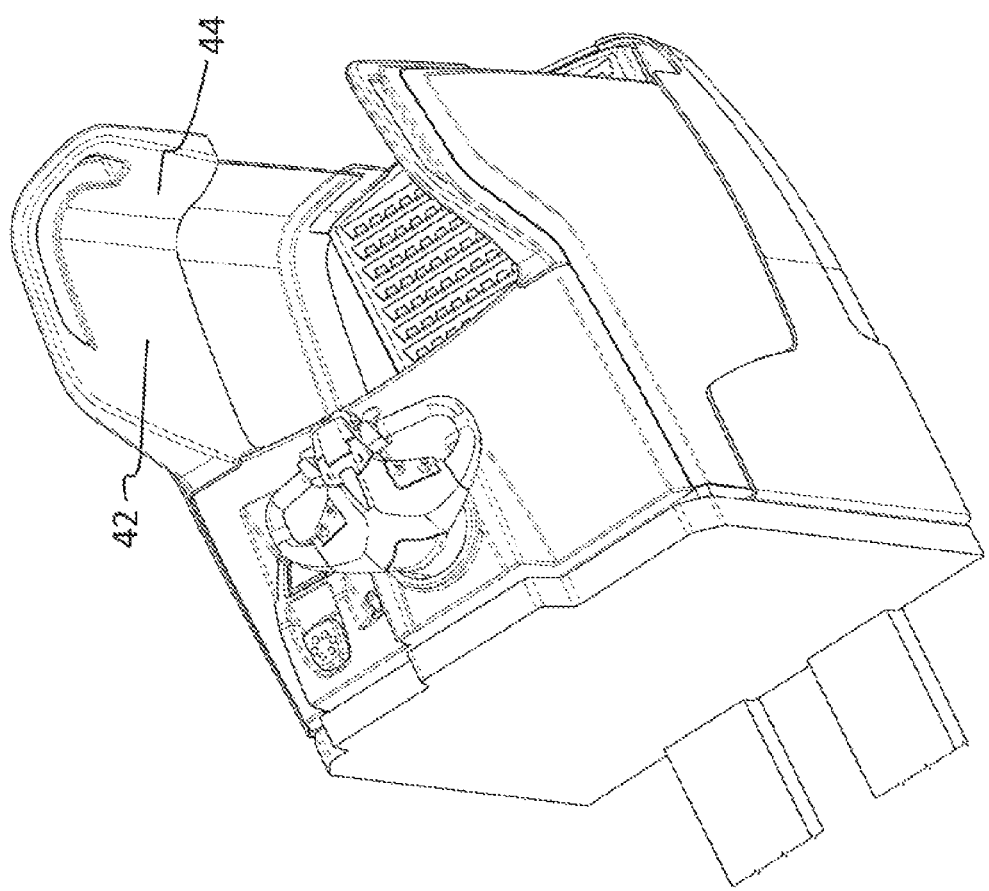

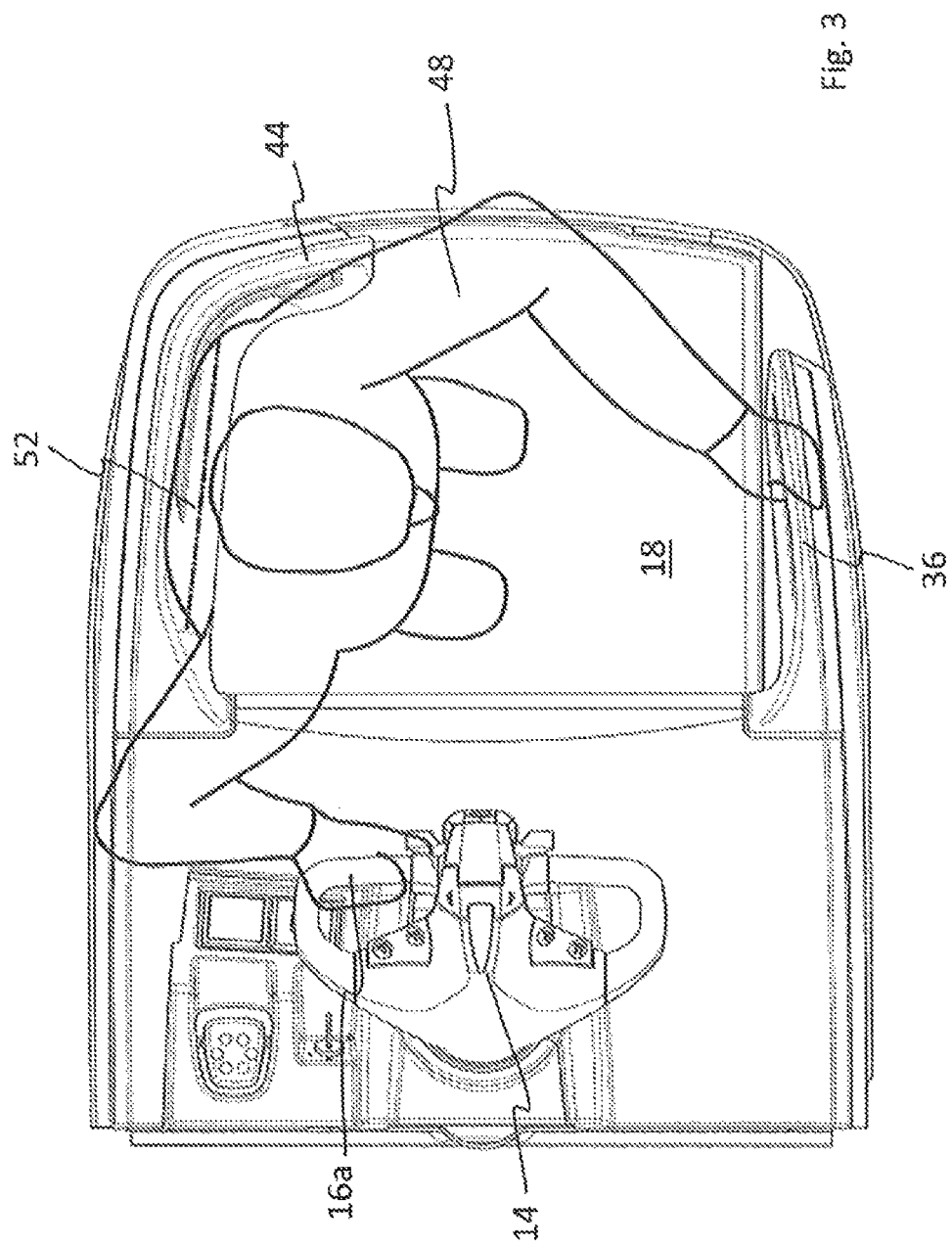

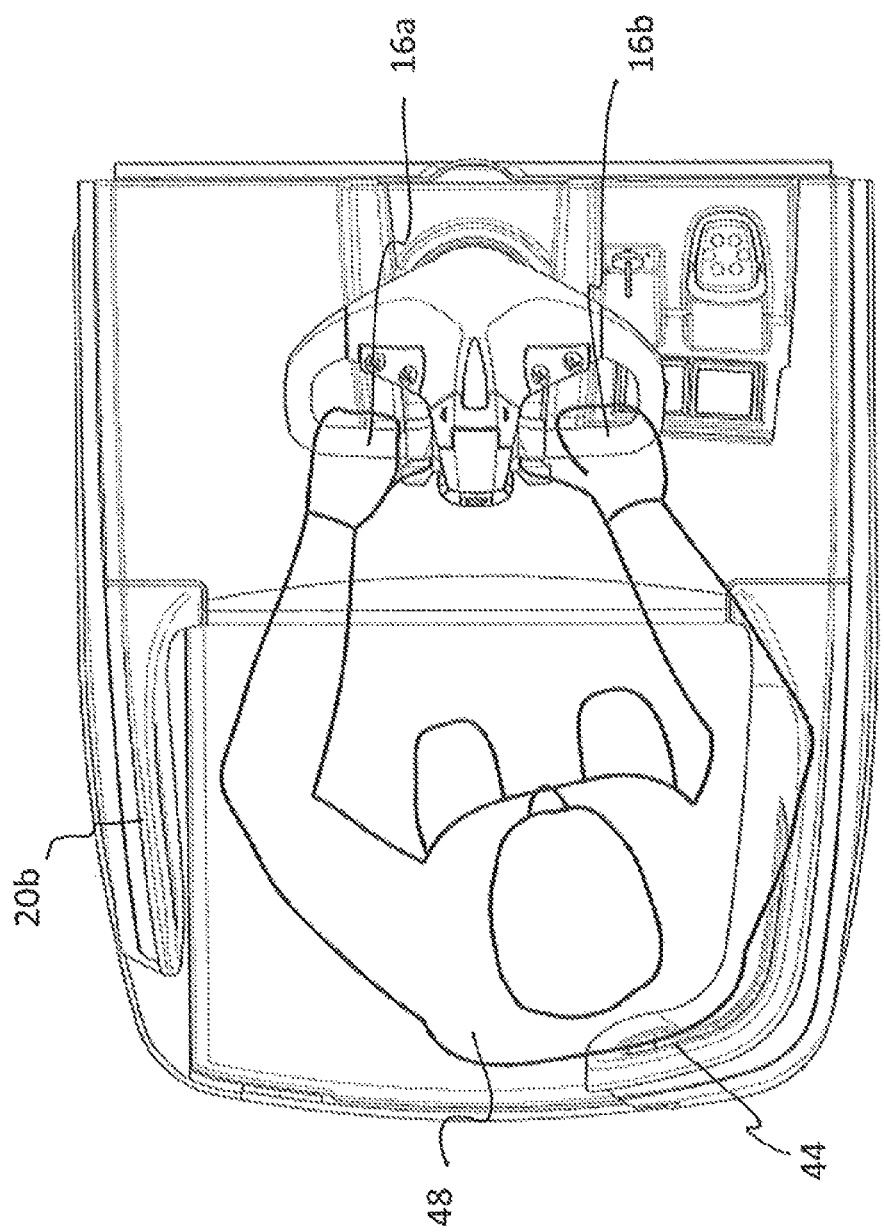

INDUSTRIAL TRUCK WITH A DRIVER STANDING PLATFORM

CROSS REFERENCE TO RELATED INVENTION

This application is based upon and claims priority to, under relevant sections of 35 U.S.C. § 119, German Patent Application No. 10 2019 101 869.2, filed Jan. 25, 2019, the entire contents of which are hereby incorporated by reference.

BACKGROUND

The present invention relates an industrial truck with a driver standing platform. For the driver standing platform an entrance is provided, which is bounded by two side walls.

The configuration of a driver standing platform and especially its lateral boundaries is the subject of technical developments in many different aspects. An important function in the configuration of a driver standing platform and its surrounding boundaries is to support the driver. This support is intended to assist a standing driver, for example during longer journeys or when cornering. The driver can lean back and steer the vehicle in this position. For industrial trucks with a driver standing platform, there are various possible stand positions that are of interest to the driver. On the one hand, a frontal position with a view in the longitudinal direction of the vehicle is of interest when driving forwards in the direction of the load unit. On the other hand, when driving in the opposite direction with the load picked up, a view away from the driver standing platform and the load unit is of interest. In order to support the standing driver in a standing position, an area is provided in the side wall for the driver standing platform, which is, for example, padded and adapted to the contours of the body to provide support. It is also known to support a driver in his standing position, for example by means of padded projections.

In addition, a vehicle with a sidewall which merges into a semi-circular section and offers a standing position for an operator rotated by 45° relative to a longitudinal axis of the vehicle is known from the state of the art. The straight section merges into the semi-circular section so that an operator standing in this semi-circular section can overlook the surroundings of the vehicle from his diagonal position and can also overlook the surroundings of the vehicle in the direction of the load and also away from the load with a slight rotation of the body, though support for the operator in the diagonal position is not provided.

BRIEF SUMMARY OF THE INVENTION

The underlying task of the invention is to provide an industrial truck that provides an ergonomically suitable stand for the driver by simple means.

In an embodiment, the industrial truck comprises a driver standing platform. The driver standing platform is laterally limited by at least two side walls forming an entrance. Furthermore, a control unit is attached to one side of the driver standing platform and is configured to be handled by a person standing on the driver standing platform. Preferably, the control unit is located on the side opposite the entrance. One of the at least two side walls provides support for the person standing in a transverse position. The transverse stand position is oriented along the longitudinal direction of the vehicle, whereby in a transverse stand position the frontal plane defined by hips or shoulders is approximately parallel to the longitudinal direction of the vehicle. In the transverse stand position, the operator supports himself with his back dorsally against the support means of the side wall. In an embodiment, at least one of the side walls is provided with a back section. The back section provides a further support means which is intended for an oblique front stand position. Both support means can be assigned a plane which corresponds to the frontal plane of a person supported by the support means. According to an embodiment, the orientation of the support means of the driver standing platform is such that the support means or their respective planes enclose an angle such that the oblique front stand position and the transverse stand position form their own support positions. In case of the individual support positions, the person using the respective support means has a spatially precisely defined position, whereby there are two positions which are different from each another. In this case, the oblique front stand position and the transverse stand position are different stand orientations for the operator, each of which has its own specific support means. Any intended transition between the support means of the side wall and that of the back section may be rounded, but the transition is not rounded to such an extent that a further support position is created in the transition area by the rounding or the two support means merge into a common support means. Instead, in an embodiment, the back section and at least one of the side walls form their own support means for their respective support positions, each of which supports a separate orientation of the operator. The particular ergonomic advantage of the present vehicle is that the side wall and back section create a total of two different support positions and thus support an individual positioning of the driver on the driver standing platform.

In an embodiment, a the support means of the back section extends along a first plane and the support means of the side wall extends along a second plane, each of which corresponds substantially to a frontal plane of a person supported by the respective support means. The plane may also correspond to a surface of the support means, wherein here substantially rounded shapes are provided. The plane of the support means on the side wall intended for the transverse stand position is oriented at an acute angle to the longitudinal direction of the vehicle. This implies that even with a transverse stand position the operating person is not completely parallel to the longitudinal direction of the vehicle with his frontal plane, but the frontal plane is inclined at an acute angle to the longitudinal direction of the vehicle. For the acute angle, an angle of no more than 20°, preferably no more than 12°, has proven to be particularly advantageous.

In an embodiment, both side walls have support means for a transverse stand position. The support means and their respective planes are oriented relative to each other and relative to the longitudinal direction of the vehicle in such a way that their distance to each other increases from the entrance to the control unit. In relation to the geometry of the industrial truck, this results in the operator supporting himself with his back against one of the two side walls looking towards the load unit.

In an embodiment, the support means for the oblique front stand position exhibits a plane which encloses an obtuse angle with the longitudinal direction of the vehicle. The intersection of the plane with the longitudinal direction of the vehicle produces a total of four angles, the obtuse angle being the first in the mathematically defined direction of rotation. The support means for the oblique front stand position supports the operator in a position in which the operator is facing predominantly towards the load, but the sagittal axis forms an angle with the longitudinal axis of the vehicle. At the same time, however, it is not a full frontal position in which the sagittal axis coincides with the longitudinal axis of the vehicle. Of particular interest is also the relative orientation of the planes for the oblique frontal and transverse positions. Depending on the configuration, an acute angle between the two planes may be provided here. However, there is also the configuration in which these two planes enclose an angle of 90°+/−20° or preferably of 90°+/−10°. Whereas the orientation of the plane for the oblique front stand position in relation to the longitudinal axis of the vehicle is an absolute orientation of the position in the vehicle, when determining the angular range between the oblique front stand position and the transverse stand position, the planes are oriented relative to each other. With this relative orientation to each other, there is naturally an angle in the range of 90°, since the stand position between an oblique front stand position and the transverse stand position is set in relation to each other. In the case of relative orientation, the absolute orientation is determined by the angle between the plane for the transverse stand position and the longitudinal direction of the vehicle, for example.

In another embodiment, a handle is attached to one of the side walls. The handle allows an operator to grasp the handle with his free hand, while engage the control unit with the other hand whilst standing in the oblique position. Holding on to the opposite side provides the operator with a stable standing position, which also allows him to steer the vehicle reliably. In addition, holding on to the handle also allows the head and upper body to be moved safely in order to observe the surroundings to the vehicle and the route.

It has been noted that the surface area of the support means for the oblique front stand position may be smaller than the surface area of the support means for the transverse stand position. The area of the support means for the oblique front stand position is sufficiently large to support an average-sized operator in the oblique front stand position at his back. Support is preferably provided in the area of the back, especially in the lumbar region, which effectively relieves the spinal column. Ergonomic studies have also shown that the oblique front stand position is not assumed for as long periods of time as the transverse stand during normal working activities with an industrial truck, so that the area-wise support is completely sufficient to support the operator. In a preferred configuration, the back section therefore does not extend over the entire height over which the side wall extends.

BRIEF DESCRIPTION OF THE DRAWINGS

A preferred embodiment of the invention is explained below by means of the figures. The figures show:

FIG. 1a illustrates a side perspective view of an embodiment of a the drive part of an industrial truck;

FIG. 1b illustrates a top perspective view of the embodiment of the drive part of FIG. 1a;

FIG. 3 illustrates a top plan view of a schematically drawn operator positioned in an embodiment of a transverse stand position; and FIG. 4 illustrates a top plan view of a schematically drawn operator in an an embodiment of an oblique front stand position.

DETAILED DESCRIPTION OF THE INVENTION

Figure 2:
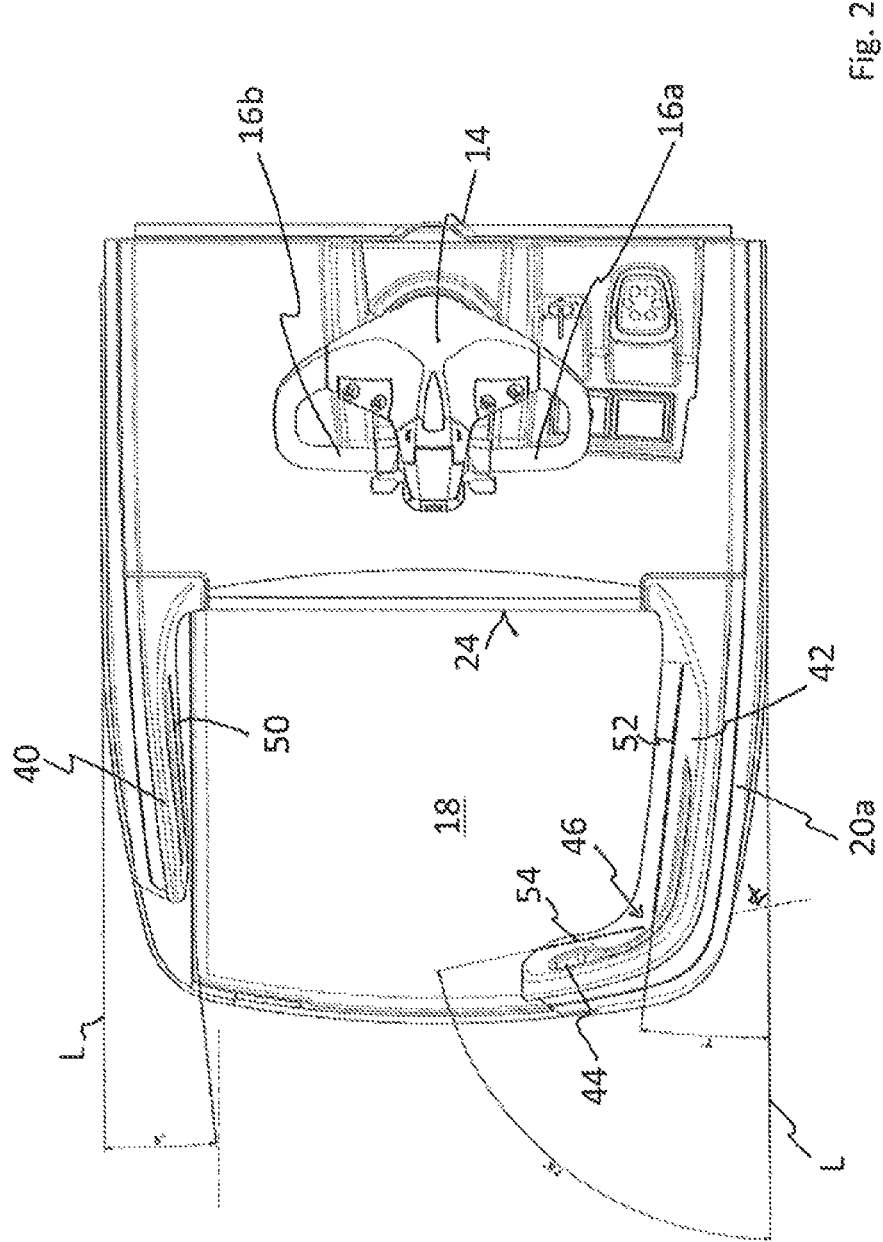
FIG. 2 illustrates aa top plan view of an embodiment of a driver standing platform.

FIG. 1a shows the drive part 10 for an industrial truck, without a lifting part. A lifting part, either a low lifting part or a multi-section high lifting part, is joined to side 12. With regard to the drive part 10, the vehicle is completely modular so that lifting sections known per se do not need to be shown here in detail. The drive part 10 has a control unit 14, which has two handles 16a, 16b that can be grasped. The control unit 14 shown here essentially has the function of a steering wheel and pivots about a vertical axis. Alternatively, the control unit 14 can also be configured as a short drawbar, in which the position of the drawbar arm determines the steering direction.

The drive part 10 also comprises a driver standing platform 18, which is laterally bounded by two side walls 20a and 20b. Between the side walls 20a and 20b there is an entrance 22 through which the operator reaches the driver standing platform 18. On the third side, the driver standing platform 18 is limited by the front wall 24. The front wall 24 (see FIG. 2) essentially forms the closure of the component compartment, which is located underneath the control unit 14.

A back section 26 is attached to the side wall 20a. In the embodiment shown, the back section 26 extends over the entire height of the side wall 20a. A protruding support means 44 is provided in the upper area of the back section 26. The protruding support means 44 extends further into the entrance 22 than the back section 26 in the lower area on the driver standing platform 18. The protruding support means 44 and the side wall 20a are provided with a common handle element 30. The handle element 30 has a horizontally arranged handle 32 and a vertically arranged handle 34 in the area of the entrance. Both handles 34 and 32 are connected to each other by a continuous free space that allows the handles to be gripped. The side wall 20b has a handle 36 running in the longitudinal direction, with which the side wall 20b terminates. Below the handle 36 is an opening 38 which allows the handle 36 to be grasped even when wearing gloves. Below the opening 38, a support means 40 is provided which serves a transverse position corresponding to a support area.

FIG. 1b shows the support means 44 on the back section and the support means 42 on the side wall 20a in a spatial view of the driver standing platform.

FIG. 2 shows a top view of the geometric proportions of the support means 40, 42 and 44. At the side wall 20b a plane 50 for the support means 40 is drawn as a dotted line. The support means 40 supports a transverse stand that encloses an angle of 5° with a vehicle longitudinal axis L. The vehicle longitudinal axis L is herein drawn on the side of the vehicle on the outside of the side wall 20b. In principle, the vehicle longitudinal axis L can be shifted in parallel and can run parallel or inside the vehicle in any position. In addition to the support means 40 for support in a first transverse position, a second support means 42 is provided on the side wall 20a, the plane 52 of which also includes an angle of approximately 5° relative to the vehicle longitudinal axis L. In the embodiment shown, the support means 40, 42 for the first and second transverse stand have the same angle with respect to the longitudinal axis L of the vehicle. However, this is by no means necessary; on the contrary, the support means 42 on the side wall 20a, for example, may be more inclined, as a result of which the inclined front stand also changes its position through the rear section 26. A plane 54 for supporting the transverse front stand is drawn on the support means 44. It can be recognized there that this plane 54 in the embodiment shown encloses an obtuse angle α with the vehicle longitudinal direction L.

FIG. 2 also shows that a transition area 46 between the support means 42 for supporting the transverse stand and plane 52 for supporting the oblique front stand, merges into each other in a rounded manner, without forming a new support means in this area for supporting the operator in another position.

FIG. 3 shows a phantom FIG. 48 standing on the driver standing platform 18 and grasping the handle 16a of control unit 14 with his right hand. With the other hand (left hand) the operator 48 grasps the handle 36. The handle 16a of the control unit 14 and the handle 36 of the side wall are approximately at the same height, so that the operator can take a relaxed position in his shoulders. The operator 48 is supported by the support means 42, the plane 52 of which is indicated by a dash dotted line. Plane 52 lies against the back and supports the person's back dorsally. The second support means 44 does not have a supporting function in this position, but is only intended to limit lateral movement of the operator 48.

FIG. 4 shows the operator 48 in his oblique front stand. In the oblique front stand, the operator is supported by the support means 44 of the back section 26. In the oblique front stand, the operator 48 can grasp handles 16a and 16b without stretching his arms too much. An important aspect of the invention is that in the transverse stand, it is very desirable for the operator to be supported across the entire width of his body. In contrast, for the oblique front stand, a back section extending approximately half the width of the back is perfectly sufficient to provide sufficiently comfortable support.

LIST OF REFERENCE NUMBERS 10 drive part
12 side
14 control unit
16a, b handles
18 driver standing platform
20a, b side walls
22 entrance
24 front wall
26 back section
30 handle element
32 handle
34 handle
36 handle
38 opening
40 support means
42 support means
44 support means
46 transition area
48 person/operator
50 plane
52 plane
54 plane

The invention claimed is:
1. An industrial truck comprising:
a driver standing platform;
at least two side walls forming an entrance to the driver standing platform, wherein one of the at least two side walls comprises a support for a transverse standing position of an operator, wherein the support for the transverse standing position extends along a first plane;
a control unit positioned opposite the entrance and configured to be operated by the operator while standing on the driver standing platform; and
a back section positioned on one of the at least two side walls and configured to extend into the entrance and comprising a support for an oblique front standing position of the operator, wherein the support for the oblique front standing position extends along a second plane, and wherein the back section is positioned at an angle relative to the support for the transverse standing position,
wherein the support for the oblique standing position is positioned at an acute angle relative to a longitudinal vehicle axis.

2. The industrial truck according to claim 1, wherein the acute angle is ≤20°.

3. The industrial truck according to claim 1, wherein the acute angle is ≤12°.

4. The industrial truck according to claim 1, wherein both of the at least two side walls each comprise a support for an oblique standing position, and wherein a distance between each of the supports increases from the entrance towards the control unit.

5. The industrial truck according to claim 1, wherein the first plane and the second plane intersect at an acute angle.

6. The Industrial truck according to claim 5, the first plane and second plane intersect at an obtuse angle.

7. The industrial truck according to claim 1, wherein the first plane and the second plane intersect at an angle from 70° to 110°.

8. The industrial truck according to claim 1, further comprising a handle positioned on at least one of the at least two side walls.

9. The industrial truck according to claim 1, wherein the support for the oblique front standing position comprises a surface that is smaller than a surface of the support for the transverse standing position.

10. The industrial truck according to claim 1, wherein the back section is shorter than the one of the at least two side walls.

11. The industrial truck according to claim 9, wherein the one of the at least two side walls comprising the back section further comprises an upper edge that is flush with an upper edge of the back section.

12. The industrial truck according to claim 1, wherein the oblique front standing position
and the transverse standing positon comprise separate supports.

13. The industrial truck according to claim 1, wherein the first plane is substantially parallel to a frontal plane of the operator when in the transverse standing positon, wherein the frontal plane extends along one of: (i) hips; and (ii) shoulders of the operator, and wherein the second plane is substantially parallel to a frontal plane of the operator when in the oblique front standing position.

* * * * *